United States Patent [19]

Suzuki

[11] 4,197,539
[45] Apr. 8, 1980

[54] TARGET DETECTING AND RANGING SYSTEM

[75] Inventor: Tomohiko Suzuki, Hyogo, Japan

[73] Assignee: Furuno Electric Co., Ltd., Nagasaki, Japan

[21] Appl. No.: 954,028

[22] Filed: Oct. 23, 1978

[30] Foreign Application Priority Data

Oct. 21, 1977 [JP] Japan .................................. 52-127126

[51] Int. Cl.$^2$ ................................................ G01S 7/30
[52] U.S. Cl. ............................ 343/17.1 R; 343/5 VQ
[58] Field of Search ......................... 343/5 VQ, 17.1 R

[56] References Cited

U.S. PATENT DOCUMENTS

| | | | |
|---|---|---|---|
| 3,155,912 | 11/1964 | Applebaum et al. | 343/17.1 R X |
| 3,491,360 | 1/1970 | Stoorvogel | 343/17.1 R |
| 3,495,244 | 2/1970 | LaRosa | 343/17.1 R |
| 3,855,593 | 12/1974 | Van Hijfte et al. | 343/17.1 R X |
| 3,905,032 | 9/1975 | Truel et al. | 343/5 VQ X |
| 3,946,382 | 3/1976 | Kossiakoff | 343/5 VQ |
| 4,044,352 | 8/1977 | Wilmot | 343/5 VQ |

FOREIGN PATENT DOCUMENTS 703373 2/1965 Canada .................. 343/17.1 R

Primary Examiner—Malcolm F. Hubler

Attorney, Agent, or Firm—Sughrue, Rothwell, Mion, Zinn and Macpeak

[57] ABSTRACT

A target detecting and ranging system of the type transmitting search pulses and receiving echo pulses is disclosed. The system employs an input receiver receiving return signals and feeds them to an extracting circuit, a gate and cancellation circuit. The extracting circuit, functions to supply an input to the gate of signals containing relevant information such that gate output is only irrelevant information. The cancellation circuit, receiving the gate output and the return signals, eliminates irrelevant signals by mutual cancellation. The circuit for extracting relevant signals comprises in one embodiment a differentiator, analog store and parallel adder with a shaping circuit, clipping the output below a threshold level. Digital implementation is also discribed. The differentiator may also be replaced by a compression circuit. In a second embodiment of the system an integrator is interposed between the gate and the cancellation circuit. The integrator has a long time constant for short duration return pulses, that is containing relevant data and a short time constant for long duration pulses and functions to improve shaping of the irrelevant signals supplied to the cancellation circuit. The output of the cancellation circuit to both embodiments is fed to an amplifier and then to a display device.

20 Claims, 8 Drawing Figures

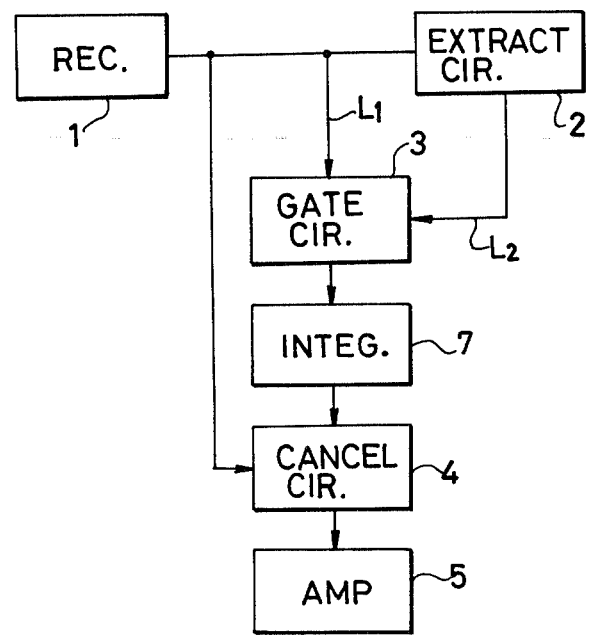
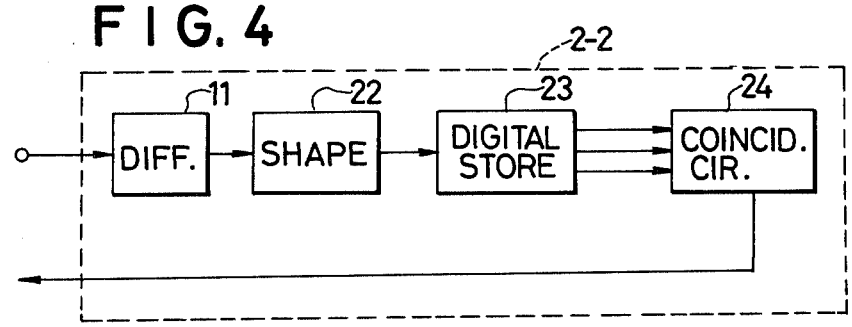
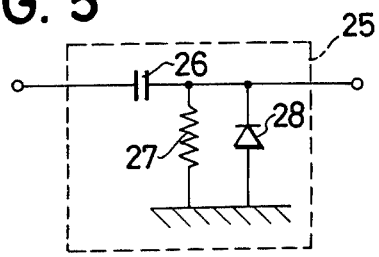

TARGET DETECTING AND RANGING SYSTEM

BACKGROUND OF THE INVENTION

This invention relates to a target detecting and ranging system. More particularly it relates to a method and apparatus for eliminating unwanted echo signals to obtain and indicate only the desired signals reflected back from targets of interest. This invention minimizes the effect of unwanted echo signals in the indicating apparatus of such systems.

The invention has particular application in radar systems which locate targets by transmitting recurring pulses of electromagnetic energy and receiving the echo pulses caused by the transmitted pulses and reflected back from obstacles. It can also be applied in echo-sounders or the sonar class devices which determine the range and/or the bearing of targets by radiating pulses of ultrasonic energy and receiving the echoes caused thereby.

Hereinafter, the invention will be explained as embodied in a shipborne radar system although the invention is not limited to that particular system.

A radar system ship mounted is required to eliminate echoes reflected back from a rough water surface or echoes from rain-drops (respectively called as "sea clutter" or as "rain clutter") out of the entirety of signals received by an antenna so that the desired signals from targets of interest can, under any weather conditions, be easily and correctly identified on the face of a cathode ray tube indicator. As is well known, if received echo signals including sea clutter signals are directly furnished, without any signal processing, to the indicator, the sea clutter signals appear as a large bright area around the center of the PPI display, thereby overshadowing desired return signals and hence making it difficult to identify them. In order to solve this problem, such well-known methods have been employed as, for example: (1) a FTC (Fast Time Constant) circuit; (2) methods of using filter circuits; and (3) a method employing a STC (Sensitivity Time Control) circuit. However, none of these methods completely solves the problem.

The technique utilizing the STC circuit, for example, can not inherently achieve the object of eliminating only the sea clutter signals from all directions. When the circuit is adjusted as to completely eliminate the sea clutter signals in a specific direction, desired return signals from other directions appear on the PPI display smaller than the ones well representing the actual individual targets. In a worst case condition no desired return signals will appear on the PPI display even if the targets can be recognized by an operator in the surrounding area of the ship. This phenomenon comes from the fact that the intensity of the sea clutter signals from a windward direction is greatest and that from a leeward direction is smaller. Also, from directions therebetween it is the smallest, while the receiver gain control by the STC circuit is constant irrespective of any azimuthal direction being scanned.

The STC circuit functions to restrain the receiver from saturation, thereby suppressing sea clutter signals so as to derive desired return signals. The circuit applies, in synchronism with each transmission of searching pulses, to the first stage of the intermediate frequency amplifier of the reciever negative biasing which automatically varies along a predetermined STC characteristic curve as a function of the time for the time period corresponding to a range. The magnitude of the negative biasing is greatest at zero range and successively increases up to zero at a predetermined range. Hence, if the STC circuit is adjusted to completely eliminate the sea clutter signals from an upwind direction, the negative biasing produced thereby is much greater than necessary for downward and midway directions. Consequently, the return signals from targets of interest lying in the downward and midway directions appear smaller than expected and in some cases will not appear at all on the face of the PPI indicator.

SUMMARY OF THE INVENTION

Accordingly, an object of the present invention is to provide a radar system which can, under any weather conditions, automatically and effectively suppress unwanted return signals from any azimuthal direction to derive only signals from targets without suppression of signal strength.

Another object of this invention is to provide an echo-sounder or sonar system which can, under any surrounding conditions, effectively suppress unwanted return signals and obtain desired return signals.

Accordingly in one aspect of the present invention, a target detecting and ranging system is defined for transmitting recurring pulses of electromagnetic or ultrasonic energy and receiving echo signals. The system suppresses irrelevant return signals to derive solely return signals from targets of interest. Hence the system is used for conspicuously indicating the relevant return signals in an indicator. The invention includes a circuit for extracting relevant signals out of received return signals in response to a plurality of transmissions of a searching pulse, and a circuit for eliminating from the received return signals the portions thereof corresponding in time to the derived signals of interest thereby obtaining irrelevant signals therefrom. Also, the system includes a circuit for producing output signals in proportion to the amplitude difference between the obtained irrelevant signals and the received return signals.

Other objects and features of the present invention will be described in more detail herein with reference to accompanying drawings.

BRIEF DESCRIPTION OF THE DRAWINGS

In the drawings:

FIG. 2 is a schematic block diagram of a signal processing unit of a radar system according to a second embodiment of the present invention;

FIG. 4 is a detailed schematic block diagram of another component unit to be used in FIGS. 1 and 2;

FIG. 5 is a schematic circuit ciagram of a component to be used in replace of a component in FIG. 4;

Throughout the drawings, same reference numerals are given to like components, and same alphabetic reference designations are given to like signals.

DESCRIPTION OF THE PREFERRED EMBODIMENT

Figure 1:
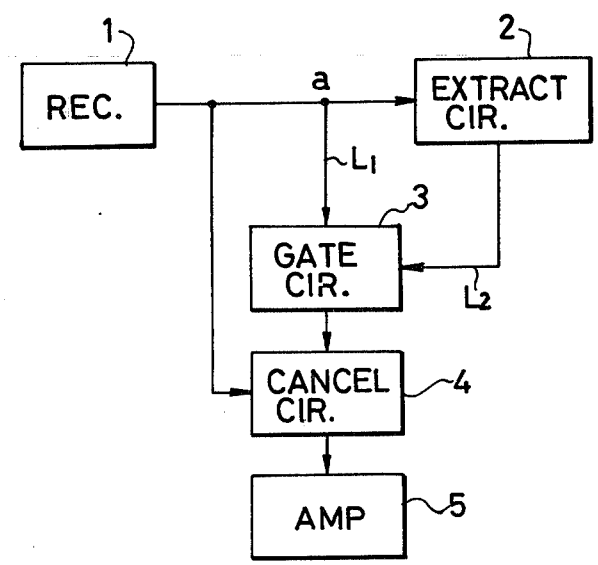
FIG. 1 is a schematic block diagram of a signal processing unit of a radar system according to a first embodiment of the present invention.
Figure 3:
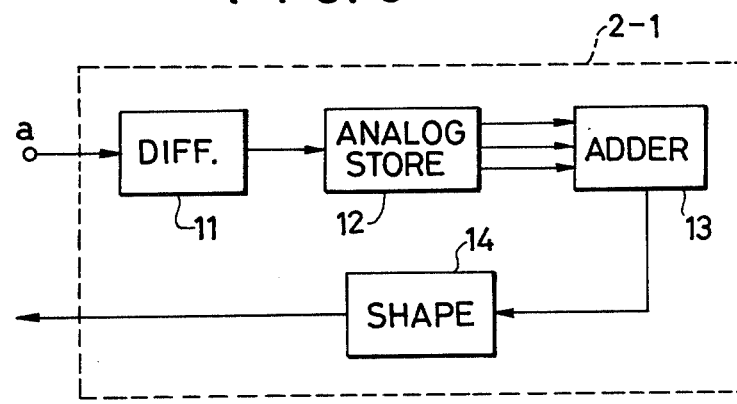
FIG. 3 is a detailed schematic block diagram of a component unit to be used in FIGS. 1 and 2.
Figure 6:
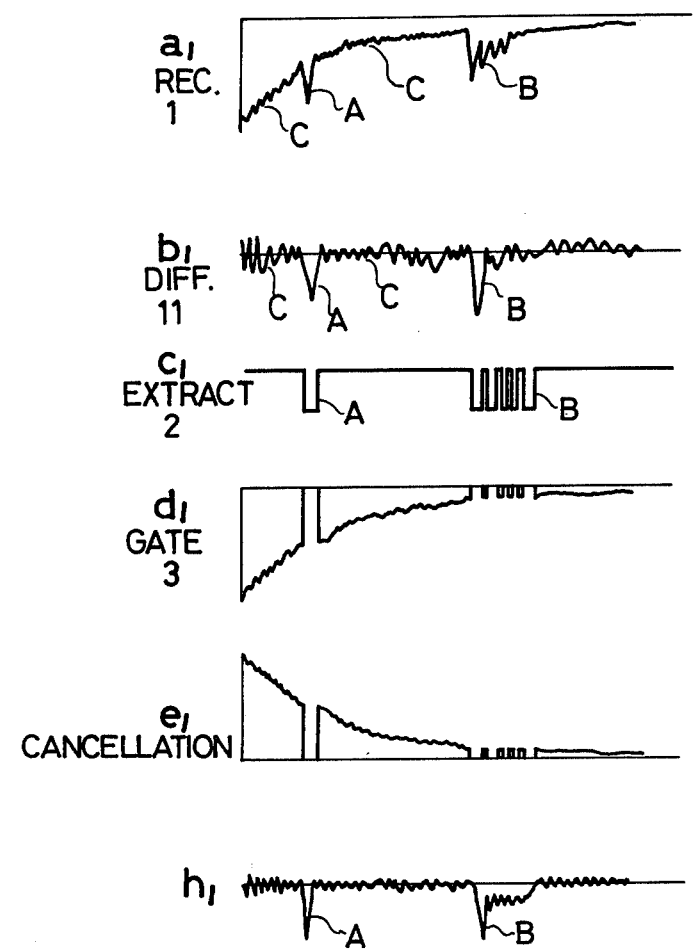
FIG. 6 is a diagrammatic representation of the signals occurring at selected points in the signals processing unit in FIG. 1.

Referring now to FIG. 1, a radar receiver 1 produces, in response to every transmission of a short length pulse of electromagnetic energy, return signals as shown in FIG. $6(a_1)$. In the Figures, it is to be noted that A represents a signal reflected back from a ship; B represents signals from an island; and C represents signals from the water surface. The output of the radar receiver is connected to the input of a relevant signal extracting circuit 2 and to one input of both a gate circuit 3 and a cancellation circuit 4. The relevant signal extracting circuit 2 is constructed as illustrated in FIGS. 3 or 4 and will be explained in detail later. It functions to extract only periodically returning signals in response to a plurality of transmissions of a searching pulse and reflected back from stationary targets as shown in FIG. $6(c_1)$.

The output of the relevant signal extracting circuit 2 is connected to the other input of the gate circuit 3. The gate circuit operates to interrupt the flow of the signals fed to the first input $L_1$ only when the signals (FIG. $6(c_1)$) are applied to said the other input $L_2$ thereof, thereby producing the output signals as shown in FIG. $6(d_1)$. The output of the gate circuit 3 is connected to the other input of the cancellation circuit 4. The cancellation circuit 4 comprises an inverting circuit for inverting in polarity the input signals to obtain the signals as shown in FIG. $6(e_1)$, and a summing circuit for summing the inverted signals and the return signals (FIG. $6(I_1)$) directly sent from the receiver 1. The output of the cancellation circuit will be the desired return signals as shown in FIG. $6(f_1)$. The output of the cancellation circuit 4 is coupled to the input of a video amplifier 5.

Referring now to FIG. 3, the relevant signal extracting circuit 2-1 comprises a differentiator 11, an analog storage circuit 12, an addition circuit 13, and a clipping and shaping circuit 14. The input of the differentiator 11 is connected to the output of the radar receiver 1, and the output thereof is connected to the input of the analog storage circuit 12. The differentiator 11 functions to eliminate d.c. components and to derive only the alternating current components from the input signals. The analog storage circuit 12 may comprise a plurality of analog shift-refisters arranged in parallel with each other, each of which in turn receives and stores the input signals in response to each of successive transmissions of a searching pulse, and all the shift-registers produce at a time corresponding stored signals to the addition circuit 13. The addition circuit 13 adds the parallel entering input signals to each other, thereby increasing the amplitude of periodic return signals from targets of interest while keeping sea clutter signals below a certain lower level. The output of the addition circuit 13 is connected to the input of the clipping and shaping circuit 14. This circuit 14 derives the only signals below a predetermined level and shapes them into rectangular waveforms as shown in FIG. $6(c_1)$.

In operation, the radar return signals (FIG.$6(d_1)$) from radar receiver 1 are supplied, successively in synchronism with each of transmissions, to differentiator 11 of relevant signal extracting circuit 2 wherein the signals (FIG. $6(b_1)$) are obtained with direct current components eliminated. These signals are immediately stored by storage circuit 12 and are partially summed and transformed by addition circuit 13 into the rectangular waveforms A or B corresponding to a ship or an island. The portions of the return signals (FIG. $6(d_1)$) corresponding in time to the extracted desired return signals are eliminated by gate circuit 3, thereby obtaining only the unwanted sea clutter signals. By adding in cancellation circuit 4 the inverted signals (FIG. $6(e_1)$) and the return signals directly supplied thereto to each other, the unwanted sea clutter signals are eliminated by mutual cancellation and thus only the desired return signals (FIG. $6(h_1)$) are obtained and transmitted to the indicator through video amplifier 5.

Figure 8:
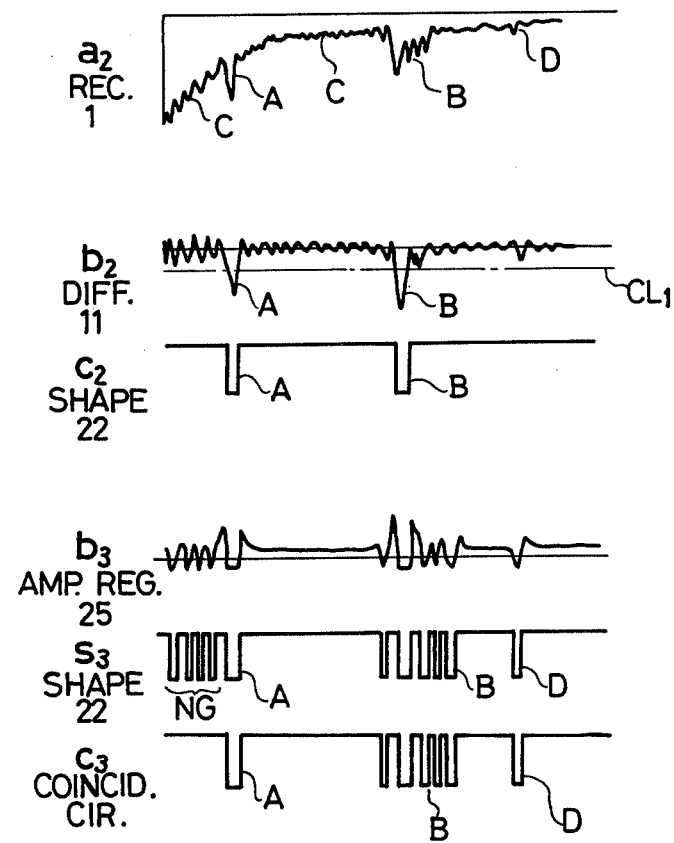
FIG. 8 is a diagrammatic representation of the signals for use in explaining the operation of the component unit in FIG. 4 and the circuitry in FIG. 5.

Referring to FIG. 4, a second embodiment of the relevant signal extracting circuit 2 is shown. It comprises a differentiator 11, a clipping and shaping circuit 22, a digital storage circuit 23, and a coincidence circuit 24. The input of the differentiator 11 is connected to the output of the radar receiver 1, and the output thereof is connected to the input of the clipping and shaping circuit 22. The differentiator 11 transforms the output signals FIG. $8(a_2)$ from the receiver 1 into the signals as shown in FIG. $8(b_2)$ with d.c. components substantially eliminated. The clipping and shaping circuit 22 functions to obtain the output signals lying below a clipping level CL, and to shape them into retangular waveforms as shown in FIG. 8 $(c_2)$. These signals are supplied to a digital storage circuit 23. The digital storage circuit 23 may comprise a plurality of digital shift-registers arranged in parallel with each other, each of which in turn receives and stores input signals in response to each of successive transmissions. All the shift-registers produce and transmit at a time, corresponding stored signals to the coincidence circuit 24. The coincidence circuit 24 produces output signals as shown in FIG. $8(c_2)$ only when the output signals from each of the shift-registers are applied at the same time to corresponding each input thereof. The output of the coincidence circuit 24 is connected to the input $L_2$ of the gate circuit 3.

In the similar manner as the one illustrated in FIG. 3, this relevant signal extracting circuit 2—2 can derive the desired return signals by storing digitized return signals in response to each of successive transmissions and correlating the parallel output signals from storage circuit 23 with each other. If a clipping level $CL_1$ is set as shown in FIG. $8(b_2)$, large return signals from a nearby ship or an island can be easily obtained. Smaller desired return signals such as from distant ships can also be derived if the clipping level is raised to an appropriate magnitude. But it is extremely difficult, according to this method, for the clipping and shaping circuit 22 to derive very small desired return signals almost equal in amplitude to or smaller than sea clutter signals.

This problem can be solved by replacing the differentiator 11 in FIG. 2—2 with a peak amplitude regulator 25 as illustrated in FIG. 5. The regulator will adapt the peak amplitude of all return signals from the receiver 1 to reach to a predetermined equal level. The peak amplitude regulator 25 may comprise as shown a capacitor 26, a resistor 27, and a diode 28. The letf-hand side of the condensor 26 is connected to the output of the radar receiver 1 and the right-hand thereof is connected to the upper side of the resistor 27, the cathode of the diode 28 and to the input of the clipping and shaping circuit 22. The lower side of the resistor 27 and the anode of the diode 28 are grounded.

Peak amplitude regulator 25 produces, in response to the output signals (FIG. $8(a_2)$) from radar receiver 1, the signals as shown in FIG. $8(b_3)$ which are clipped and shaped by the circuit 22 into the signals as shown in FIG. 8(S3) which include a small desired return signal D from a distant ship as well as the echo signals from a neaby ship and an island and sea clutter signals. The sea clutter signals NG are eliminated by the correlation process carried out in coincidence circuit 24, thereby deriving only the desired return signals A or B or D from all the targets of interest.

A second variation of the relevant signal extracting circuit can be constructed by replacing the differentiator 11 in FIG. 2—2 with a compression circuit which varies the effective gain applied to the return signals as a function of the signal magnitude. In this case, the effective gain is greater for smaller rather than for larger signals. This relevant signal extracting circuit can also effectively derive small desired returned signals as well as the large signals from nearby ships or islands.

Referring now to FIG. 2, the arrangement of the block diagram is similar to the one in FIG. 1 except that the integrator 7 is inserted between the gate circuit 3 and the cancellation circuit 4. The input of the integrator 7 is connected to the output of the gate circuit and the output thereof is connected to the input of the cancellation circuit 4. The integrator 7 is adapted to have its time-constant large for short duration return pulses as for example from ships or for densely crowded return signals as sea clutters while being small for long duration return pulses as for example, from islands.

Figure 7:
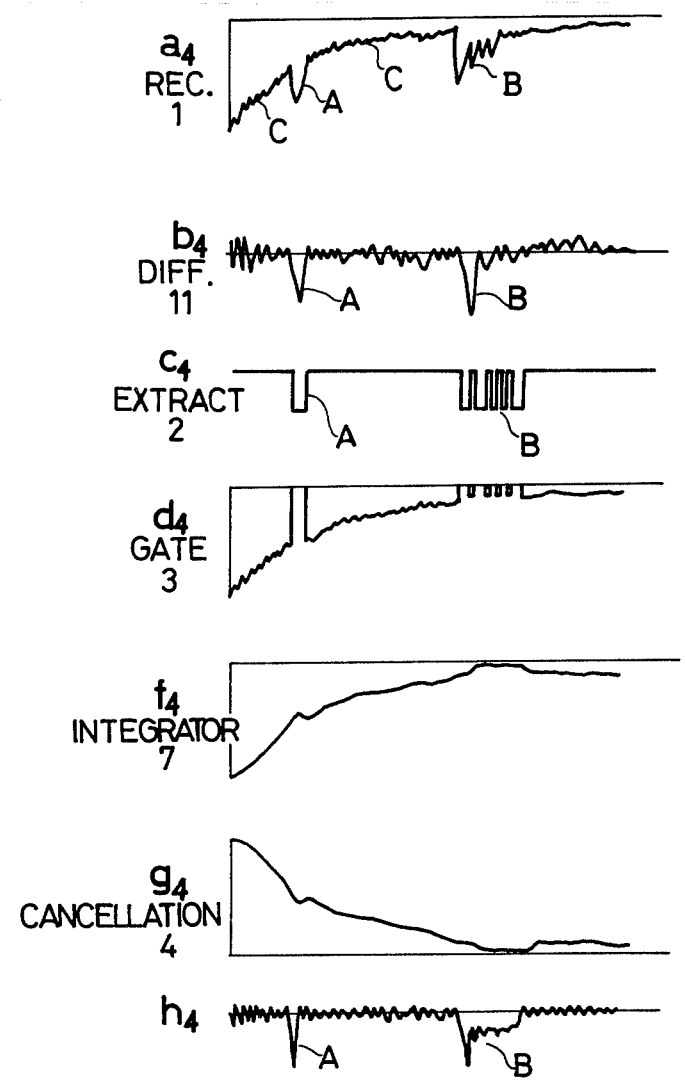
FIG. 7 is a diagrammatic representation of the signals occurring at selected points in the signal processing unit in FIG. 2.

In operation, the radar return signals (FIG. 7($a_4$)) from the radar receiver 1 are supplied, successively in synchronism with each of transmissions of a searching pulse, to the relevant signal extracting circuit 2 wherein only the desired return signals are derived and transformed into the output signals as shown in FIG. 7($C_4$) which are transmitted to an input $L_2$ of the gate circuit 3. The gate circuit 3 interrupts in response to the signals (FIG. 7($C_4$)) the flow of the signals (FIG. 7($a_4$)) fed to an input $L_1$, thereby obtaining irrelevant or unwanted signals as shown in FIG. 7($d_4$) which are then integrated by the integrator 7 and shaped into the output signals as shown in FIG. 7($f_4$). The cancellation circuit 4 first inverts the signals (FIG. 7($f_4$)) into a waveform as shown in FIG. 7($g_4$) and then sums this inverted signals and directly supplied signals (FIG. 7($a_4$)), thereby obtaining only the desired return signals from objects of interest with the sea clutter signals eliminated or greatly suppressed. It should be noted that this embodiment of the present invention can more effectively suppress unwanted signals than the first one in FIG. 1, since it can obtain well shaped irrelevant signals by means of the integrator 7.

The specific means for extracting wanted signals, means for obtaining unwanted signals and means for obtaining desired return signals based both on the redeived return signals and the unwanted signals are not respectively limited only to the several relevant signal extracting circuits and the gate circuit 3 and the cancellation circuit described in the foregoing Preferred Embodiments. The cancellation circuit 4 can be, for example, replaced by a differential amplifier whose output signal is proportional to the algebraic difference between two input signals. Hence, variations of this invention are permissible without departing from the essential scope of the invention.

I claim:

1. In a target detecting and ranging system for transmitting recurring searching pulses of electromagnetic or ultrasonic energy and receiving echo signals, for suppressing irrelevant return signals to derive relevant return signals from targets of interest, and for clearly indicating the relevant return signals in an indicator, the improvement comprising:
   (i) means for extracting relevant signals out of received return signals in response to a plurality of transmissions of a searching pulse,
   (ii) means for eliminating out of received return signals the portions thereof corresponding in time to the derived relevant signals, thereby obtaining irrelevant signals therefrom, and
   (iii) means for producing output signals in proportion to the amplitude difference between the derived irrelevant signals and the received return signals.

2. A target detecting and ranging system as defined in claim 1, wherein the means for extracting relevant signals comprises,
   (i) means for deriving alternating current components from received return signals and providing an analog output signal,
   (ii) means for storing the analog output signals, in response to a plurality of transmissions of a searching pulse, from said means for deriving alternating current components,
   (iii) An addition circuit for adding the analog output signals to each other produced in parallel by said means for storing the analog output signals, and
   (iv) means for clipping at a predetermined clipping level and for shaping into proper wave shapes the output signals from said addition circuit.

3. A target detecting and ranging system as defined in claim 1, wherein the means for extracting relevant signals comprises,
   (i) means for deriving alternating current components from received return signals,
   (ii) means for clipping at a predetermined clipping level and for shaping into proper wave shapes the output signals from said means for deriving alternating current components and providing a digital output signal,
   (iii) means for storing the digital output signals, in response to a plurality of transmissions of a searching pulse from said means for clipping and shaping, and
   (iv) a coincidence circuit for producing an output signal parallel produced output signals from said means for storing the digital output signals coincide.

4. A target detecting and ranging system as defined in claim 1, wherein the means for extracting relevant signals comprises,
   (i) means for adapting the peak amplitude of received return signals to a predetermined level,
   (ii) means for clipping at a predetermined clipping level and for shaping into proper wave shapes the output signals from said means for deriving alternating current components and providing a digital output,
   (iii) means for storing the digital output signals in response to a plurality of transmissions of a searching pulse from said means for clipping and shaping, and
   (iv) A coincidence circuit for producing an output signal when parallel produced output signals from said means for storing the digital output signals coincide.

5. A target detecting and ranging system as defined in claim 1, wherein the means for extracting relevant signals comprises,
  (i) a compression circuit which varies the effective gain applied to the received return signals as a function of the signal magnitude,
  (ii) means for clipping at a predetermined clipping level and for shaping into proper wave shapes the output signals from said means for deriving alternating current components and providing a digital output,
  (iii) means for storing the digital output signals in response to a plurality of transmissions of a searching pulse from said means for clipping and shaping, and
  (iv) a coincidence circuit for producing an output signal when parallel produced output signals from said means for storing the digital output signals coincide.

6. A target detecting and ranging system as defined in claim 1, wherein the means for eliminating the relevant portions of received return signals and for obtaining irrelevant signals comprises a gate circuit.

7. A target detecting and ranging system as defined in claim 1, wherein the means for producing output signals in proportion to the amplitude difference between the irrelevant signals and the received return signals comprises,
  (i) an inverting circuit for inverting the polarity of the irrelevant signals obtained, and
  (ii) a summing circuit for summing the received return signals and the inverted irrelevant signals.

8. The target detecting and ranging system of claim 1 further comprising an integrator interposed between said means for obtaining irrelevant signals and said means for producing output signals, said integrator integrating the irrelevant signals and delivering the output thereof to said means for producing output signals whereby said output signals are in proportion to the amplitude difference between the integrated irrelevant signals and the received return signals.

9. A target detecting and ranging system as defined in claim 8, wherein the means for extracting relevant signals comprises,
  (i) means for deriving alternating current components from received return signals and providing an analog output signal,
  (ii) means for storing the analog output signals, in response to a plurality of transmissions of a searching pulse from said means for deriving alternating current components,
  (iii) an addition circuit for adding the analog output signals to each other produced in parallel by said means for storing the analog output signals, and
  (iv) means for clipping at a predetermined clipping level and for shaping into proper wave shapes the output signals from said addition circuit.

10. A target detecting and ranging system as defined in claim 8, wherein the means for extracting relevant signals comprises,
  (i) means for deriving alternating current components from received return signals,
  (ii) means for clipping at a predetermined clipping level and for shaping into proper wave shapes the output signals from said means for deriving alternating current components and providing a digital output signal,
  (iii) means for storing the digital output signals, in response to a plurality of transmissions of a searching pulse from said means for clipping and shaping, and
  (iv) a coincidence circuit for producing an output signal when parallel produced output signals from said means for storing the digital output signals coincide.

11. A target detecting and ranging system as defined in claim 8, wherein the means for extracting relevant signals comprises,
  (i) means for adapting the peak amplitude of received return signals to reach to a predetermined level,
  (ii) means for clipping at a predetermined clipping level and for shaping into proper wave shapes the output signals from said means for deriving alternating current components and providing a digital output,
  (iii) means for storing the digital output signals in response to a plurality of transmissions of a searching pulse from said means for clipping and shaping, and
  (iv) a coincidence circuit for producing an output signal when parallel produced output signals from said means for storing the digital output signals coincide.

12. A target detecting and ranging system as defined in claim 8, wherein the means for extracting relevant signals comprises,
  (i) a compression circuit which varies the effective gain applied to the received return signals as a function of the signal magnitude,
  (ii) means for clipping at a predetermined clipping level and for shaping into proper wave shapes the output signals from said means for deriving alternating current components and providing a digital output,
  (iii) means for storing the digital output signals in response to a plurality of transmissions of a searching pulse from said means for clipping and shaping, and
  (iv) a coincidence circuit for producing an output signal when parallel produced output signals from said means for storing the digital output signals coincide.

13. A target detecting and ranging system as defined in claim 8, wherein the means for producing output signals in proportion to the amplitude difference between the integrated irrelevant signals and the received return signals comprises,
  (i) an inverting circuit for inverting in polarity the integrated irrelevant signals, and
  (ii) a summing circuit for summing the received return signals and the inverted irrelevant signals.

14. A method of deriving relevant information from return signals in a target detecting and ranging system comprising the steps of:
  transmitting search signals and receiving return signals from targets of interest,
  extracting from said return signals relevant signal data in response to a plurality of transmissions of search signals,
  gating the received return signals selectively in time using said relevant signals data to obtain irrelevant signal data,
  producing output signals in proportion to the amplitude difference between the irrelevant signal data and the received return signals, and amplifying and displaying the output signals.

15. The method of claim 14 wherein the step of extracting comprises the steps of;
deriving alternating current components from said return signal and producing an analog output signals,
storing the analog signals obtained in response to a plurality of transmissions,
adding the analog output signals to each other and,
clipping the added signals below a predetermined level and shaping the resultant signal into a rectangular waveform.

16. The method of claim 14 wherein the step of extracting comprises the steps of;
deriving alternating current components from said signals,
clipping at a predetermined level the derived components and shaping to form a digital output signal,
storing the digital output signals in response to a plurality of transmissions and,
producing a coincidence output signal when the digital output signals coincide.

17. The method of claim 14 wherein the step of extracting comprises the steps of;
raising the peak amplituide of said return signals to a predetermined level to derive uniform amplitude signals,
clipping and shaping the uniform amplituide signals to form a digital output signal,
storing the digital output signals in response to a plurality of transmissions and,
producing a coincidence output signal when the digital output signals coincide.

18. The method of claim 14 wherein the step of extracting comprises the steps of;
varying the effective gain applied to the received return signals as a function of signal magnitude.

19. The method of claim 14 wherein the step of producing output signals in proportion to the amplitude difference comprises the steps of;
inverting the polarity of the irrelevant signals obtained, and
summing the received return signals and the inverted irrelevant signals.

20. The method of claim 14 further comprising the steps of integrating the irrelevant signals data producing by gating and, providing the integrated irrelevant signals to produce output signals in proportion to the amplituide difference between the integrated irrelevant irrelevant signals and the received return signals.

* * * * *